United States Patent
Derrick et al.

[11] 3,806,769
[45] Apr. 23, 1974

[54] STACKED ELECTRODE CAPACITOR AND METHOD OF MAKING SAME

[75] Inventors: Noah S. Derrick, Lexington; Jacob T. Zeigler, Cayce, both of S.C.

[73] Assignee: General Electric Company, Owensboro, Ky.

[22] Filed: Apr. 20, 1972

[21] Appl. No.: 246,069

[52] U.S. Cl. .............................. 317/230, 317/261
[51] Int. Cl. .......................... H01g 3/07, H01g 9/04
[58] Field of Search .......... 317/230, 261; 29/25.41, 29/25.42, 470.1, 472.3

[56] References Cited
UNITED STATES PATENTS

| | | | |
|---|---|---|---|
| 3,237,274 | 3/1966 | Kalina | 29/25.42 |
| 3,234,628 | 2/1966 | Frekku | 29/25.41 |
| 3,654,524 | 4/1972 | Puppalo et al. | 317/230 |
| 2,497,066 | 2/1950 | Brennan | 317/261 X |
| 3,596,147 | 7/1971 | Zeppieri et al. | 317/230 |
| 3,518,500 | 6/1970 | Jimerson et al. | 317/230 |

*Primary Examiner*—Rudolph V. Rolinec
*Assistant Examiner*—William D. Larkin
*Attorney, Agent, or Firm*—Nathan J. Cornfeld; Dennis A. Dearing; Frank L. Neuhauser

[57] ABSTRACT

Planar electrodes are stacked in a capacitor assembly with dielectric spacers separating cathode foils from adjacent anode foils. The foils are stacked so that respective cathode and anode foils protrude from opposite sides of the stack. The electrode foils are welded to respective terminal rods using a scrub weld by applying pressure to the foils to press them against the terminal rod while imparting concurrent lateral movement to thereby remove oxides and other foreign materials from the foil surfaces so that the foils may weld together and to the terminal rod.

4 Claims, 7 Drawing Figures

PATENTED APR 23 1974    3,806,769

STACKED ELECTRODE CAPACITOR AND METHOD OF MAKING SAME

BACKGROUND OF THE INVENTION

This invention relates to stacked electrode capacitors useful in high frequency applications where higher current values are desired. More particularly, this invention relates to stacked electrode capacitors having a wide range of working voltages.

For certain applications such as, for example, high frequency applications a lower impedance is desirable. This may be obtained by assembling the anode and cathode foils in a flat stack rather than, for example, winding the foils in a coil configuration. Leads are attached to respective cathode and anode foils in at least one variety by TIG welding. Such capacitors have been found to be more easily constructed for low voltage applications than high voltage. This is because the higher voltages require a heavier oxide layer on the foil to withstand the operating voltages. Heavy oxide layers on the foil inhibit or prevent formation of a good electrical connection from the lead to the foil itself using inert gas welding techniques. It is therefore an object of this invention to provide a novel flat capacitor wherein the leads are attached to foils having sufficiently thick oxide layers thereon to withstand higher voltages of, for example, 100–200 volts. These and other objects of the invention will become apparent from the description and drawings.

DESCRIPTION OF THE PREFERRED EMBODIMENT

Figure 1:
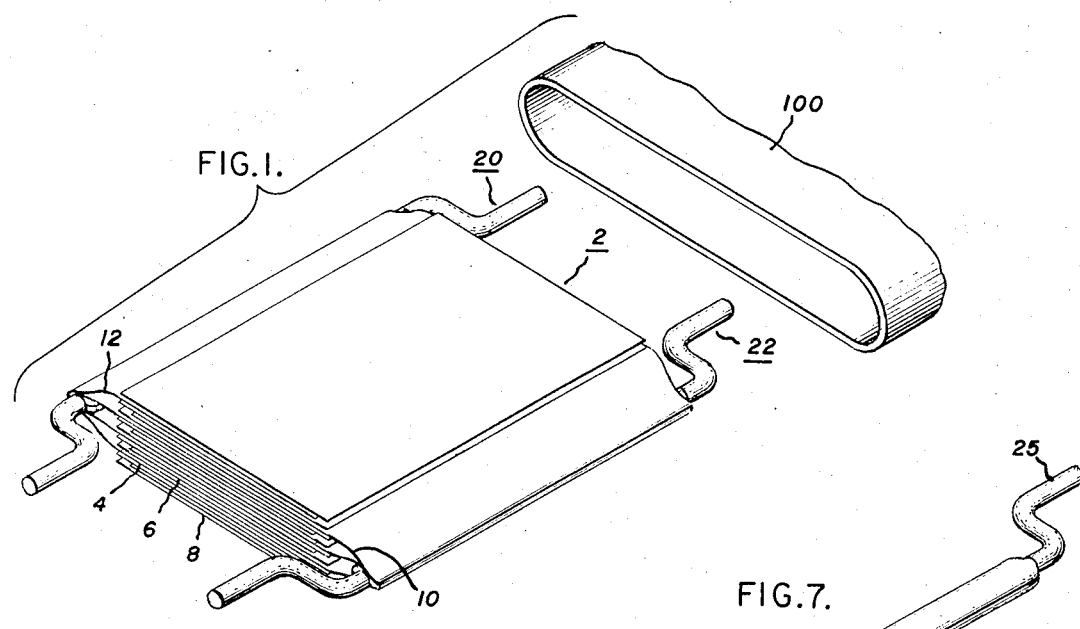
FIG. 1 is an isometric exploded view of the finished capacitor in accordance with the invention.

Referring now to FIG. 1, a capacitor constructed in accordance with the invention is generally indicated at 2. Capacitor 2 comprises anode foils 4 which are stacked between cathode foils 6 with spacer members 8 therebetween. The anode and cathode foils comprise aluminum in the preferred embodiment. At least the anode foils are anodized to provide a layer of aluminum oxide on the foil which comprises the dielectric of the capacitor. It is also within the scope of the invention for both anode and cathode foil to be anodized when a non-polarized capacitor is desired.

In accordance with the invention the foils are stacked so that the cathode foils 6 protrude from one end 10 of the stack while the anode foils 4 protrude from the opposite side 12 of the stack. The anode foils protruding from end 12 of the capacitor stack are then welded to a terminal rod 20 while the cathode foils protruding from end 10 of the stack are welded to a second terminal rod 22. The terminal rods 20 and 22 are constructed of the same material as the foils and thus comprise, in the preferred embodiment, aluminum.

Figure 2:
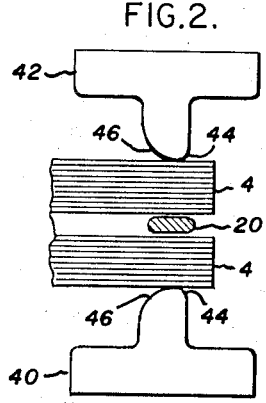
FIGS. 2–6 are cross-sectional sequential illustrations of the formation of the weld-bond of the capacitor illustrated in FIG. 1.

Now referring to FIGS. 2 to 6 the steps of welding aluminum anode foils 4 to aluminum terminal rod 20 will be described. Terminal rod 20 is placed between anode foils 4 adjacent edge 12 of the stack and about half way through the stack as shown in FIG. 2. The stack with terminal rod 20 in position is then placed in a press (not shown) between die members 40 and 42.

Die members 40 and 42 are generally rounded at their top edge to have a sharp radius of curvature 44 adjacent the edge of the stack and a curvature of larger radius facing the center of the stack and designated generally at 46. The curved portions 44 and 46 are shaped in the manner described and illustrated to assist in the formation of the weld by urging the foils into a curved configuration which is believed to contribute to the lateral movement or scrubbing action which characterizes the formation of the bond between the foils and the terminal rod. In a preferred embodiment the radius of curvature of portion 46 is about three times that of the radius of portion 44. The two curvatures, of course, also each result in a tangetial point which, when urged against a similar point on the mating die forms a cut-off somewhat similar to a chisel point, yet, due to the rounded surface, with a greater squeezing action rather than cutting action as would be true with a chisel point or edge.

Figure 3:
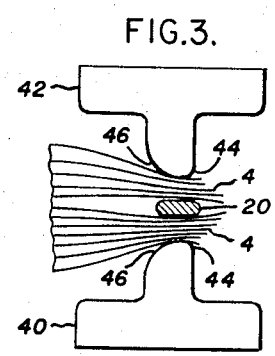
Figure 4:
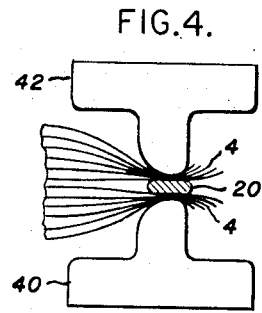

The ram of the press is closed bringing die 42 down against uppermost foils of the capacitor assembly and generally urging the stack against die 40. As seen in FIGS. 3 and 4 the larger radius of curvature 46 on the dies guides the foils 4 into a conforming curvature as the foils are squeezed together. FIG. 4 shows the press in an almost closed position wherein all of the foils 4 have been pressed against rod 20 but the deformation of rod 20 has not yet commenced.

Figures 5, 6:
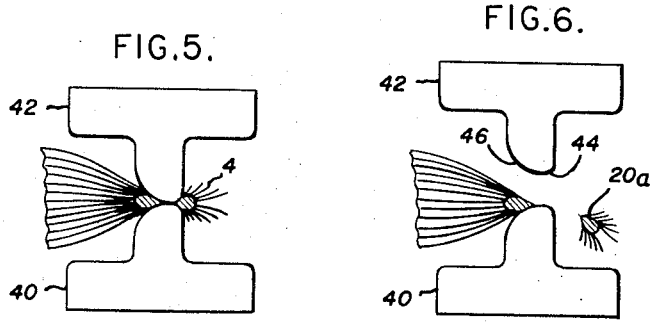

In FIG. 5, the movement of the ram carries die 42 down to a point where rod 20 has been deformed and lateral movement of both rod 20 and foils 4 (which are being squeezed against the rod) has commenced. This lateral movement of the foils under pressure provides what may be termed as a scrubbing action of each of the foils against adjacent foils as well as terminal rod 20. The scrubbing or abrasive action of this lateral movement is believed to assist in removal of the oxide layers on the adjacent foils enabling the foils and the rod to cold weld against one another. The lateral action of the foil layers against one another is believed due to the differences in the amount of curvature of adjacent foils as the press closes. Those foils situated in the middle of the stack adjacent rod 20 move very little—at least until deformation of rod 20 commences. Those foils which are adjacent dies 40 and 42, that is, at the top and bottom of the stack, move inwardly—toward the stack—as each flat foil is shaped into a curve. This variation in curve formation which causes a variation in movement of one foil with respect to adjacent foils causes a scrubbing or abrasive action which is believed to remove the oxide layers from the aluminum allowing the foils and terminal rod 20 to weld to one another.

As rod 20 becomes deformed an additional lateral movement is observable, at least a portion of which is directed outwardly as section 20a is gradually severed from the remainder of rod 20. During this time, however, the portions of the foils adjacent the stack still move inwardly until the vertical movement of the dies 40 and 42 cease—usually upon severance of portion 20a.

When the press is then subsequently opened as in FIG. 6, portion 20a either falls away or may be easily stripped from the welded capacitor assembly.

While the amount of pressure necessary to effect the weld may vary with the thickness of the stack, the type of materials used in both the foils and the terminal rod, it has been found that a pressure range of from about 30,000 to 40,000 PSI is usually satisfactory. In a specific example wherein 50, 3.5 mil thick anodized aluminum anode foils and 1.0 mil thick aluminum cathode foils in a 1-inch thick stack were welded to an aluminum terminal rod having a thickness of about three thirty-seconds inch, a 15 ton press was found to be satisfactory.

Figure 7:
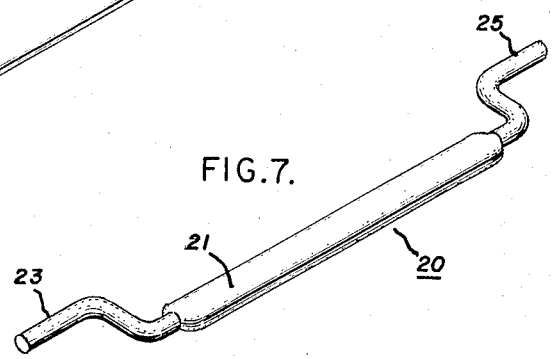
FIG. 7 is an isometric view of a terminal rod in accordance with the invention.

While terminal rod 20 may be of cylindrical cross-section, as shown more clearly in FIG. 7, terminal rod 20 in a preferred embodiment comprises a flat central portion 21 and end portions 23 and 25 which are generally round or tubular. Dies 40 and 42 are dimensioned to have the same length as the center flat part 21 and therefore tubular portions 23 and 25 are not severed or in any other way deformed by the action of the press. Tubular portions 23 and 25 are then used to provide terminal connections to the capacitor. The capacitor stack is placed in a casing 100 with the end portions 23 and 25 protruding out to the ends of the case and insulated therefrom by appropriate means such as is well known in the art. The provision of tubular portions adjacent each end of the roll is merely a matter of convenience and one or the other may be eliminated as only one is necessary.

The other terminal rod 22 is attached to the cathode foils in the same manner. Thus when both the anode foils and cathode foils have been oxidized the oxides on both of the foil stacks can be removed by the scrubbing action of the weld.

It will be readily appreciated that, inasmuch as the weld operation of the invention is completed prior to the insertion of the stack into the casing 100, the stack may be designed for non-electrolytic capacitors; or, if desired, may be for electrolytic capacitors. In the case of the electrolytic capacitors, the casings are, of course, being filled with a suitable electrolyte and thereafter sealed as is well known.

What we claim as new and desire to secure by Letters Patent of the United States is:

1. An aluminum capacitor useful at high frequencies comprising cathode and anode foils with spacers therebetween arranged in a flat stack wherein the cathode foils protrude beyond one edge of the stack and the anode foils from another edge of the stack, an anode terminal rod, and a cathode terminal rod, said anode foils and cathode foils being respectively joined to said terminal rods along substantially the entire lengths of the protruding edges in chisel edge junctions, the ends of the foils being conformably curved substantially individually to contact directly a respective terminal rod.

2. A flat aluminum capacitor formed by alternately stacking anode and cathode aluminum foils upon one another in laterally staggered array with spacers therebetween so that all of the cathode foils protrude from one edge of the stack and all of the anode foils protrude from an opposite edge of the stack, a cathode terminal rod at said one edge, and an anode terminal rod at said opposite edge, said terminal rods having cross sections of varying curvatures, the foils in the stack being bonded to the terminal rods at the points of lesser curvature.

3. The capacitor as defined in claim 1 wherein said foils within said stack are of a predetermined thickness, and the ends of said foils are of less than 25 percent of said predetermined thickness.

4. The capacitor as defined in claim 2, wherein said anode and said cathode foils are of predetermined thickness within said stack, and the ends of said foil adjacent the bonds to said terminal rods are of substantially reduced thickness.

* * * * *